Figure 1:
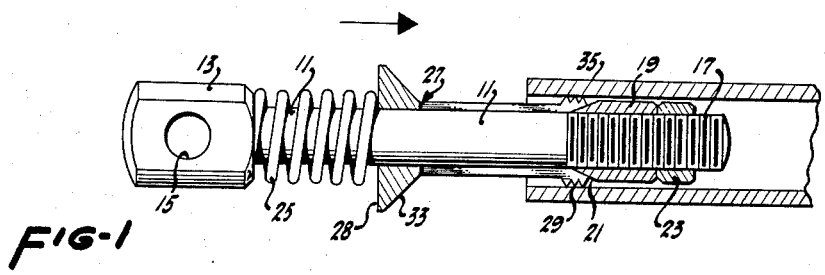

June 7, 1960  C. GRUNSKY  2,939,739

PIPE PULLER

Filed Aug. 17, 1956

INVENTOR.
CHARLES GRUNSKY
BY
Lippincott & Smith
ATTORNEYS

United States Patent Office 2,939,739
Patented June 7, 1960

2,939,739

PIPE PULLER

Charles Grunsky, San Francisco, Calif., assignor to Charles Richard Farrar and Edwin Hillman Halbach, both of Santa Cruz, Calif., jointly Filed Aug. 17, 1956, Ser. No. 604,727

1 Claim. (Cl. 294—96)

This application constitutes a continuation-in-part of applicant's application Serial No. 517,960, filed June 27, 1955 now abandoned and entitled, "Pipe Puller."

The invention herein to be described relates to a pipe puller adapted particularly for engagement with the interior surface of a pipe. The unit provides a structure such that with a pulling force exerted thereon along its axis it serves to engage and form a gripping contact with the pipe. Then, the unit will serve to pull the engaged pipe in the direction of the applied force. With a release in pulling force the unit is readily disengaged from the pipe.

In its preferred form the invention comprises a pipe-gripping component having a substantially frusto-conical shoulder member adapted to be fitted against one end of a pipe. Extending outwardly from the truncated portion of the frusto-conical shoulder and arranged to be positioned within a pipe are resilient expansible pipe-gripping elements adapted to be expanded under the influence of an expanding force so that, when expanded, they engage the pipe internal wall. In its preferred form the pipe-pulling unit comprises a spindle having at its proximal end a head to which suitable attachment of a pulling unit may be made. A wedge or similar type of element is secured at the distal end of the spindle. The wedge is adapted with a pulling force applied to the unit to force pipe-gripping teeth or dogs outwardly from the spindle to grip the interior surface of a pipe. Suitable resilient means is provided to exert a force longitudinally of the spindle normally to force the pipe-gripping teeth against the conical wedge-like element and outwardly from the spindle.

In a modification of the invention the element which is adapted to abut the pipe and from which resilient pipe-gripping elements project as cantilevers and which gripping-element preferably has its shoulder portion of conical formation. Adjacent to the shoulder base is a circumferential recess which is located between the conical face and the shoulder against which the resilient member tending to force the pipe-gripping element longitudinally of the spindle is adapted to rest. This recess or groove provides, particularly in a case where the pipe to be gripped is of approximately the same outer diameter as that of the pipe abutting shoulder, a ready means to apply an appropriate tool within the recess to insure a ready withdrawal of the pipe-gripping element from the internal wall of the pipe at times when it is desired that the contact shall be released.

In addition, in a preferred modification, the spindle of the pipe-gripping unit terminates in a hinged joint for securement to a second spindle to which the pulling force may be applied. This insures that the pipe-gripping element with the thereto secured pipe may more readily be pulled through a conduit or other larger pipe even where the conduit or other pipe is not completely straight, particularly in the case of pulling copper tubing or plastic tubing through another pipe or conduit.

The invention as herein to be described thus provides a component of great simplicity and cheapness of construction which serves nonetheless as a pulling unit and pipe-gripping element adequate to draw pipe through conduits, to hoist pipe or for other uses.

Among the objects of the invention are those of providing a generally foolproof, efficiently-operating, inexpensively-constructed pipe-gripping element which will have the efficiency of the now existing more complex type of units and to provide a unit which shall be nonethless generally small in size, easy to handle and readily usable.

A further object of the invention is to provide for ready release of the pipe-gripping element from the inner wall of the pipe. Also, it is an object of the invention to provide a pipe-gripping element in which the angle of pull may be other than along the axis of the gripping element so as to pull the unit through slightly curved pipe.

Figure 2:
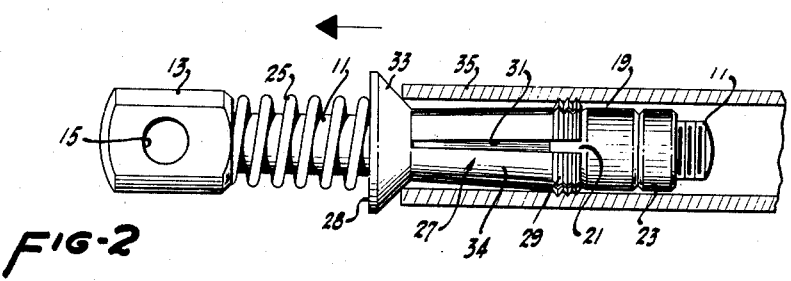
Figure 3:
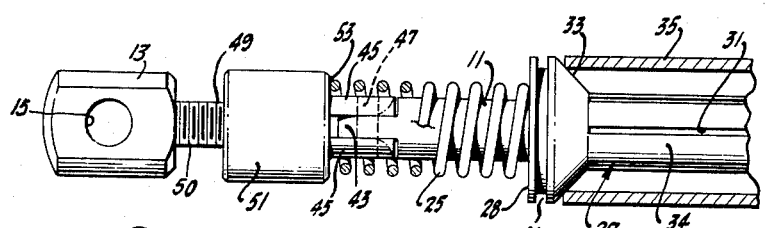
Figure 4:
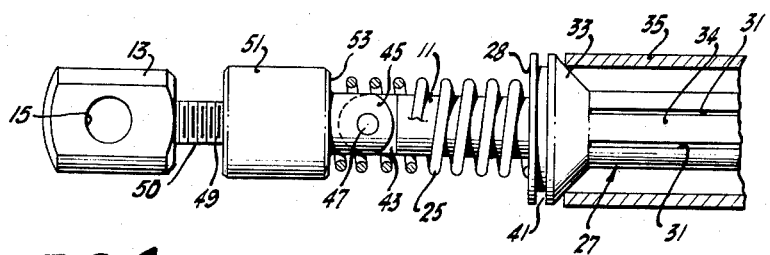

Other objects and advantages of the invention, of course, will become apparent when it is considered in conjunction with the accompanying drawings of which Fig. 1 is a longitudinal view, partly in section, showing the pipe gripping and pulling component in a position to be inserted within a pipe;

Fig. 2 is a view, also partly in section, to show the pipe-gripping and pulling unit with its pipe-gripping teeth expanded to contact the interior wall of the pipe within which it is inserted;

Fig. 3 is also a view, partly in section, of a modification of the arrangement of Figs. 1 and 2 showing particularly the pipe-abutting component adapted for more ready release and also showing the hinged connection to the pipe puller proper; and, Fig. 4 is a view of the modification shown by Fig. 3 looking in a direction approximately 90° to that of Fig. 3 and showing the device also partly in section.

Referring now to the drawings, and first to the device shown by Figs. 1 and 2, for a further understanding of the invention, the pipe pulling unit, as its main supporting element, comprises a metal spindle 11 terminating at its proximal end in a flattened head member 13. An opening or "eye" 15 is preferably formed through the flattened head member for the attachment therethrough of a cable or other type of pulling component adapted to pull the unit, illustratively, in the direction shown by the arrow in Fig. 2. The distal end of the spindle 11 terminates in a threaded portion 17 upon which there is secured an internally threaded conical wedge 19 having a forwardly sloping conical contour shown at 21. A locknut, such as that illustrated at 23, may be secured to the distal end of the spindle in order securely to lock the conical wedge 19 thereon. The surface areas of both the conical wedge and locknut may be appropriately knurled for purposes of ready securement to the spindle.

In the assembly of the unit a spring 25 is first placed around the spindle 11 with the conical wedge 19 and the locknut 23 removed. Next, a pipe-gripping unit, conventionally shown at 27, which is slidably supported on the spindle is placed over the distal end to have its flattened surface 28 rest against the outer edge of the spring which surrounds the spindle. The pipe-gripping unit 27 has at one end outwardly extending pipe-gripping teeth or dogs 29. The component is slotted longitudinally, as indicated by the slots 31 arcuately spaced about the periphery and extending outwardly from the base of the unit.

The slots form the unit into a plurality of longitudinally extending arms which can be forced outwardly from the spindle surface along an arcuate and almost radial path generally as a cantilever element fixed in position at the inner end of the slots. The gripping unit 27 terminates in a generally frusto-conical shoulder portion 33. The slots 31 thus form the pipe-gripping unit into a plurality of cantilever elements or arms 34 extending outwardly from a point closely adjacent to the truncated portion of the shoulder 33, with the various arms 34 all approximately equally circumferentially spaced on the unit. The arms thus provide a plurality of resilient members for holding the pipe-gripping teeth or dogs normally close to the spindle 11, but which are readily expanded substantially radially outwardly when forced apart by movement of the conical wedge 19 and with release of the wedge tend, due to the resiliency, to resume their original position. When the unit is assembled and the flattened surface 28 of the gripping member is rested against the spring 25 the arms formed by the inclusion of slots extend lengthwise of the spindle in the direction of the distal end. At this time the conical wedge 19 is threaded upon the spindle until its sloping side 21 forces the outer end of the projecting arms to which the teeth or dogs are attached outwardly to the extent necessary for any particular size pipe to be pulled. The locknut 23 is secured to the threaded end of the spindle to abut and clamp the conical wedge in its selected position.

The unit is then completely assembled and for the purpose of pulling a pipe. The pipe, which is represented at 35, is either slid over the distal end of the pipe puller until it abuts the frusto-conical shoulder 33 or the pipe pulling unit as a whole is inserted into the open end of the pipe until the pipe edge and the shoulder come into abutting engagement. As can be seen clearly from the drawings, the frusto-conical shoulder 33 serves to aline the gripper 27 centrally of the pipe or tube 35. It prevents a change in position of the gripper during the pulling stress and thus prevents the gripper teeth cutting into the tubing or pipe being pulled and obviously also can prevent breakage of the cantilever arms 34. At this time the force exerted by the spring 25 against the gripping unit tends to force the gripping unit toward the distal end of the spindle and with this occurring the teeth 29 on the gripping unit are spread outwardly to engage the interior wall of the pipe. For this reason, and since this unit is particularly useful for small diameter pipe, it is usually desirable to hold the conical shoulder portion against the force of the spring 25 when it is inserted into the pipe. This prevents the cone surface 21 from expanding the arms and upon release the spring will permit the first engagement between the teeth 29 and the inner pipe wall to be established. Then, with pull being exerted in the direction of the arrow shown by Fig. 2 the teeth 29 initially grip the interior wall of the pipe sufficiently hard that the conical wedge surface 21 is drawn further into the gripping element and the gripping teeth forced still harder against the interior wall of the pipe so that the complete unit then may be pulled or dragged to any desired location. For releasing the unit it is first forced inwardly of the pipe until the conical wedge is disengaged from the arms 34, permitting the arms to resume the original retracted position. Then, with the spring 25 manually held in compressed position, the entire unit may be readily withdrawn from the pipe interior.

The frusto-conical member 33 serves additional functions of closing the tubing to dirt, dust, mud or moisture during the pull. Likewise it protects the end of the tubing during pull because, as can be seen clearly from the drawing, it is of larger diameter than the tubing and therefore it is the conical member rather than the tubing which is the spearhead during the pull. The modification of the invention provided by the construction of Figs. 3 and 4 offers particularly a ready means for releasing the pipe-gripping element from the expanded position along the conical contour 21 of the conical wedge 19. This is particularly desirable when, as shown by Figs. 3 and 4, the outer diameter of the pipe 35 is substantially like that of the diameter of the largest point on the conical shoulder 33. At such times ready release of the pipe-gripping teeth from engagement with the conical shoulder 21 is often assisted where a suitable tool can be used to hold the gripping unit 27 against the force of spring 25. To this end the gripping unit 27 has its conical pipe-abutting member 33 formed, as shown by Figs. 1 and 2, but in addition, the member has a generally cylindrical extension between the base of the conical portion 33 and the flattened surface 28. In this generally cylindrical portion a substantially cylindrical circumferential groove or recess 41 is cut. Then, where the outer diameter of the pipe to be gripped approximates the base diameter of the conical portion 33, ready removal of the unit is provided by inserting a suitable tool, such as a screwdriver, in the groove 41 so that a motion of the tool against the force of the spring 25 tends to separate the gripping unit from the pipe and to release the complete component against the force exerted by the spring 25.

The modification of Figs. 3 and 4 also provides for terminating the spindle 11 in a hinged joint where the spindle end 43 is formed as a flat projecting end to fit within the forked ends 45 of a connecting spindle 49. The end 43 is secured to the forked ends 45 by a suitable connecting pin 47 passed through a hole in each element so that the end 43 of the spindle 11 movably connects to the forked ends 45 of the spindle 49. The end 50 of spindle 49 is threaded so that a suitable pulling head member (not shown) can be screw threaded thereon. The pulling attachment may then be a suitable cable or rod (as for the device of Figs. 1 and 2) suitable for drawing the complete unit and its secured pipe through a conduit or pipe.

In the assembly of the unit, prior to threadedly securing the pulling unit (not shown) to the threaded end 50 of the spindle 49, an internally threaded collar 51 is first threaded about the spindle and positioned substantially at the base of the forked ends 45 forming the coupling component for the hinge member, after which the flattened head member 13 may be attached. With the construction shown, the pin member 47 serving to join the end 43 of the spindle 11 to the forked members 45 of the spindle 49 is held loosely within a hole in each of the elements with the pin maintained within the opening preferably solely by means of the surrounding spring member 25 which surrounds, in this instance, both the forked end of the spindle 49 and the projecting end 43 of the spindle 11. The spring 25 rests against the shoulder 53 of the slidable collar 51 and against the flattened surface 28 of the conical shoulder portion 33 and usually requires no other attachment. With the arrangement shown the pull exerted upon the flattened head member 13 to draw the conical contour 21 of the wedge member 19 internally of the resiliently expandable arms 34 may be applied at an angle to the axis of the spindle 11 and thus provide a ready means for expanding the pipe grippers and at the same time drawing the unit longitudinally through a pipe regardless of whether or not the pipe is completely straight.

Various other modifications of the invention, of course, come fully within the spirit and scope thereof as it has been defined by the hereinafter appended claim.

Having now described the invention what is claimed is:

A pipe puller comprising a spindle, a pulling eye secured to the proximal end of the spindle for attaching a pulling medium thereto, a conical wedge secured substantially at the distal end of the spindle with the cone apex faced toward the eye, a tubular expansible pipe gripper having a substantially frusto-conical shaped pipe-abutting shoulder at one end arranged to surround the spindle and to be slidably supported thereon between the pulling eye and the conical wedge, said expansible pipe gripper having a plurality of cantilever arms uniformly circumferentially spaced about the spindle from substantially the base of the pipe-abutting frusto-conical shoulder to form a series of cantilever type arms terminating in outwardly extending pipe gripping teeth, a spring means surrounding the spindle between the pipe-abutting shoulder of the expansible pipe gripper and a point substantially adjacent to the pulling eye to force the expansible pipe gripper longitudinally of the spindle and externally over the conical wedge whereby upon insertion of the distal end within a pipe adapted to abut the frusto-conical shoulder and to be centered thereupon a pull exerted through the pulling eye in a direction substantially axially of the spindle and in a direction away from the distal end thereof causes the pipe gripping teeth to move outwardly from the spindle axis uniformly to contact and press upon the internal wall of the pipe, said pipe-abutting frusto-conical shoulder having a recess extending about the base thereof and between the shoulder and the spring means to hold the expansible gripper in retracted position while withdrawing the unit from the pipe, a hinge element for the spindle section between the shoulder element of the expansible pipe gripper and the pulling eye for permitting the pulling eye to be turned to a position out of axial alinement with respect to the main spindle, and an adjustable collar positioned substantially adjacent to the pulling eye and between the pulling eye and the hinge for providing changes in the compression of the spring means surrounding the spindle with longitudinal adjustment of the collar along the spindle, the spring means surrounding the spindle being positioned between the collar and the frusto-conical shoulder of the expansible gripper and adapted to surround the hinge and normally to maintain axial alignment of the pulling eye section and the expansible gripper section of the spindle due to its surrounding the hinge.

References Cited in the file of this patent

UNITED STATES PATENTS

| | | |
|---|---|---|
| 545,209 | McCormick | Aug. 27, 1895 |
| 656,009 | Bergersen | Aug. 14, 1900 |
| 812,214 | Law et al. | Feb. 13, 1906 |
| 1,718,771 | Baker | June 25, 1929 |
| 1,776,989 | Baimbridge et al. | Sept. 30, 1930 |
| 2,333,802 | Lowrey | Nov. 9, 1943 |
| 2,594,429 | Handley | Apr. 29, 1952 |
| 2,648,563 | Hall | Aug. 11, 1953 |
| 2,687,324 | Grunsky et al. | Aug. 24, 1954 |
| 2,699,354 | Kok | Jan. 11, 1955 |
| 2,719,747 | Layne | Oct. 4, 1955 |

FOREIGN PATENTS

| | | |
|---|---|---|
| 381,707 | Germany | Sept. 24, 1923 |